(12) United States Patent
Tan et al.

(10) Patent No.: US 8,812,878 B2
(45) Date of Patent: Aug. 19, 2014

(54) LIMITING FALSE WAKEUPS OF COMPUTING DEVICE COMPONENTS COUPLED VIA LINKS

(75) Inventors: Sin S. Tan, Portland, OR (US); Srikanth T. Srinivasan, Portland, OR (US); Bruce A Tennant, Hillsboro, OR (US); Dmitry Petrov, Ottawa (CA)

(73) Assignee: Intel Corporation, Santa Clara, CA (US)

( * ) Notice: Subject to any disclaimer, the term of this patent is extended or adjusted under 35 U.S.C. 154(b) by 926 days.

(21) Appl. No.: 12/495,697

(22) Filed: Jun. 30, 2009

(65) Prior Publication Data

US 2010/0332868 A1    Dec. 30, 2010

(51) Int. Cl.
*G06F 1/00* (2006.01)

(52) U.S. Cl.
USPC ........................................................... 713/300

(58) Field of Classification Search
USPC .................................................. 713/300, 310
See application file for complete search history.

(56) References Cited

U.S. PATENT DOCUMENTS

| | | | | |
|---|---|---|---|---|
| 3,919,646 | A * | 11/1975 | Morgan ...................... | 455/154.2 |
| 4,016,532 | A * | 4/1977 | Rose ............................. | 340/906 |
| 5,634,205 | A * | 5/1997 | Kurisu et al. ............... | 455/182.2 |
| 6,009,488 | A | 12/1999 | Kavipurapu | |
| 6,158,288 | A * | 12/2000 | Smith ........................ | 73/861.25 |
| 6,795,450 | B1 * | 9/2004 | Mills et al. .................... | 370/463 |
| 7,028,199 | B2 | 4/2006 | Ayyavu et al. | |
| 7,392,412 | B1 * | 6/2008 | Lo .................................. | 713/320 |
| 2003/0084344 | A1 * | 5/2003 | Tarquini et al. ............... | 713/201 |
| 2005/0047499 | A1 * | 3/2005 | Wood ............................ | 375/224 |
| 2005/0102333 | A1 * | 5/2005 | Liu ................................ | 708/200 |
| 2008/0162682 | A1 * | 7/2008 | Ramachandran et al. .... | 709/223 |
| 2008/0197886 | A1 * | 8/2008 | Kawakami ....................... | 327/64 |
| 2009/0077404 | A1 | 3/2009 | Herring et al. | |
| 2010/0174808 | A1 * | 7/2010 | Dabagh et al. ................ | 709/221 |

FOREIGN PATENT DOCUMENTS

| | | |
|---|---|---|
| CN | 1336727 A2 | 2/2002 |
| KR | 10-2003-0064434 A | 8/2003 |
| WO | 2009/044365 A2 | 4/2009 |
| WO | 2011/008402 A2 | 1/2011 |
| WO | 2011/008402 A3 | 3/2011 |

OTHER PUBLICATIONS

International Search Report and Written Opinion Received for PCT Patent Application No. PCT/US2010/038949, mailed on Jan. 24, 2011, 9 pages.

International Preliminary Report on Patentability Received for PCT Patent Application No. PCT/US2010/038949, mailed on Jan. 12, 2012, 5 pages.

Office Action Received for Chinese Patent Application No. 201010227040.1, mailed on Nov. 23, 2012, 12 pages of Office Action and 5 pages of English Translation.

Office Action received for Chinese Patent Application No. 201010227040.1, mailed on Sep. 29, 2013, 8 pages of English Translation and 13 pages of Chinese Office Action.

(Continued)

*Primary Examiner* — Mohammed Rehman
(74) *Attorney, Agent, or Firm* — Caven & Aghevli LLC

(57) ABSTRACT

Methods and apparatus relating squelch filtration to limit false wakeups are described. In one embodiment, a squelch logic generates a wakeup event for an agent based on occurrence of a number of pulses (originating from another agent) during a time period. Other embodiments are also disclosed.

20 Claims, 5 Drawing Sheets

(56) References Cited

OTHER PUBLICATIONS

Office Action Received for Chinese Patent Application No. 201010227040.1, mailed on May 2, 2013, 4 pages of Office Action and 5 pages of English Translation.

Office Action received for Chinese Patent Application No. 201010227040.1, mailed on Mar. 19, 2014, 8 pages of English Translation and 13 pages of Chinese Office Action.

\* cited by examiner

LIMITING FALSE WAKEUPS OF COMPUTING DEVICE COMPONENTS COUPLED VIA LINKS

FIELD

The present disclosure generally relates to the field of electronics. More particularly, an embodiment of the invention relates to squelch filtration to limit false wakeups.

BACKGROUND

As integrated circuit (IC) fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may damage an IC chip by, for example, thermal expansion. Also, the additional heat may limit usage locations and/or applications of a computing device that includes such chips. For example, a portable computing device may solely rely on battery power. Hence, as additional functionality is integrated into portable computing devices, the need to reduce power consumption becomes increasingly important, for example, to maintain battery power for an extended period of time. Non-portable computing systems also face cooling and power generation issues as their IC components use more power and generate more heat.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. In an embodiment, I/O circuit(s), internal clock(s), and/or a forwarded clock are turned off while retaining link state in internal memory. It should be noted that internal memory used to save state generally has significantly lower power consumption than analog I/O and clocks, and hence results in significant power savings without impacting link resumption.

Some embodiments discussed herein are generally related to limiting false wakeups of computing device component(s) coupled via link(s) (such as point-to-point or serial links), e.g., to reduce power consumption and/or heat dissipation. For example, when an agent, coupled to a link, enters a lower power consumption state (e.g., referred to as L1, idle, sleep mode, suspend, etc.) from a normal or standard power consumption state (e.g., referred to as "L0", active, etc.), a subsequent signal level change on the link (e.g., in the form of a single pulse) may indicate exit from the L1 state. However, as semiconductor form factors are constantly reducing and/or more complex circuitry is being utilized, longer traces of links may reduce signal integrity and allow introduction of noise. This may generate a false wakeup, which in turn results is unnecessary power consumption or heat dissipation due to the false wakeup. To this end, in one embodiment, multiple pulses (e.g., four pulses) during a select time period (e.g., 50 ns) may be used to indicate a wakeup event. The additional pulses and the duration of their occurrence may limit occurrence of false wakeups, for example, due to noise or signal degradation on a link. Also, the number of pulses and squelch window may be programmable to allow for tuning of the scheme based on actual hardware behavior.

Figure 1:
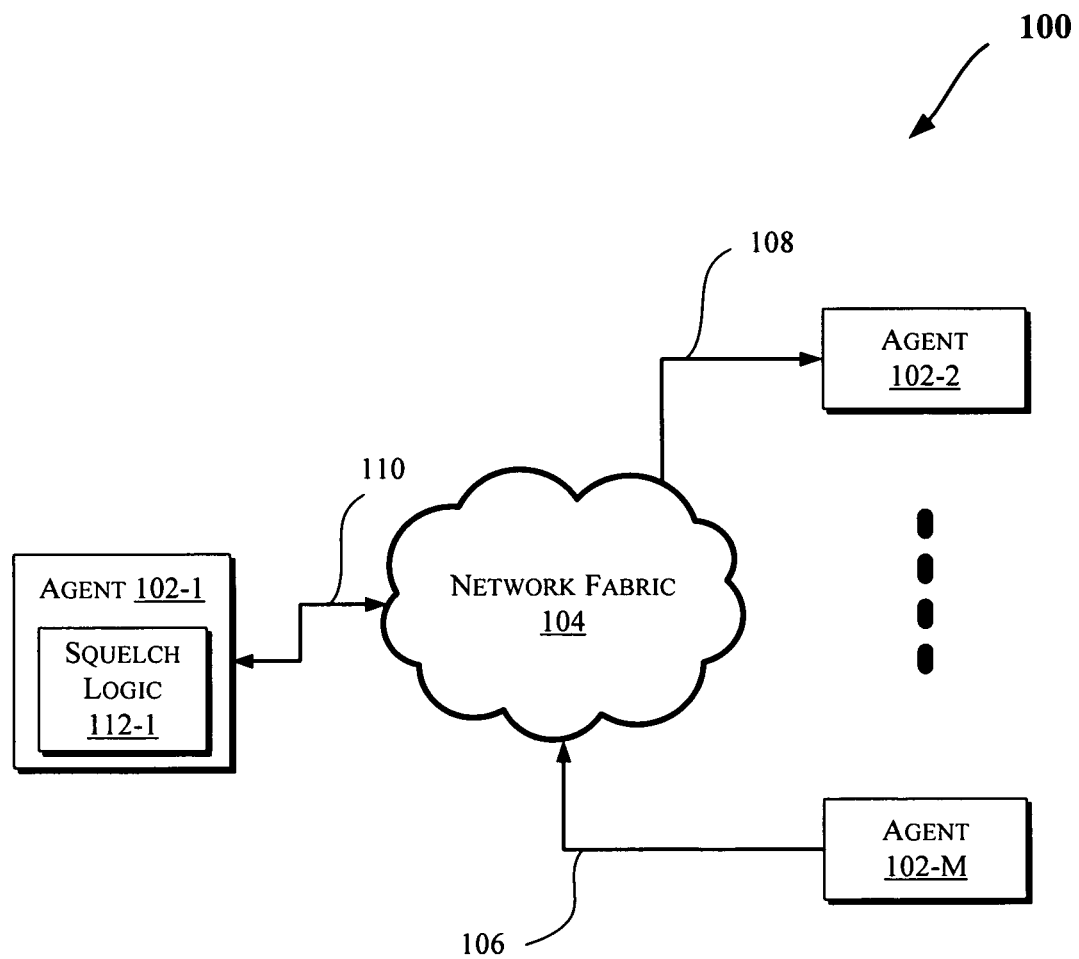
FIGS. 1 and 4-5 illustrate block diagrams of embodiments of computing systems, which may be utilized to implement various embodiments discussed herein.

Various computing systems may be used to implement embodiments discussed herein, such as the systems discussed with reference to FIGS. 1 and 4-5. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIG. 4 or 5.

As illustrated in FIG. 1, the agents 102 may communicate via a network fabric 104. In one embodiment, the network fabric 104 may include a computer network that allows various agents (such as computing devices or their components) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Figure 2:
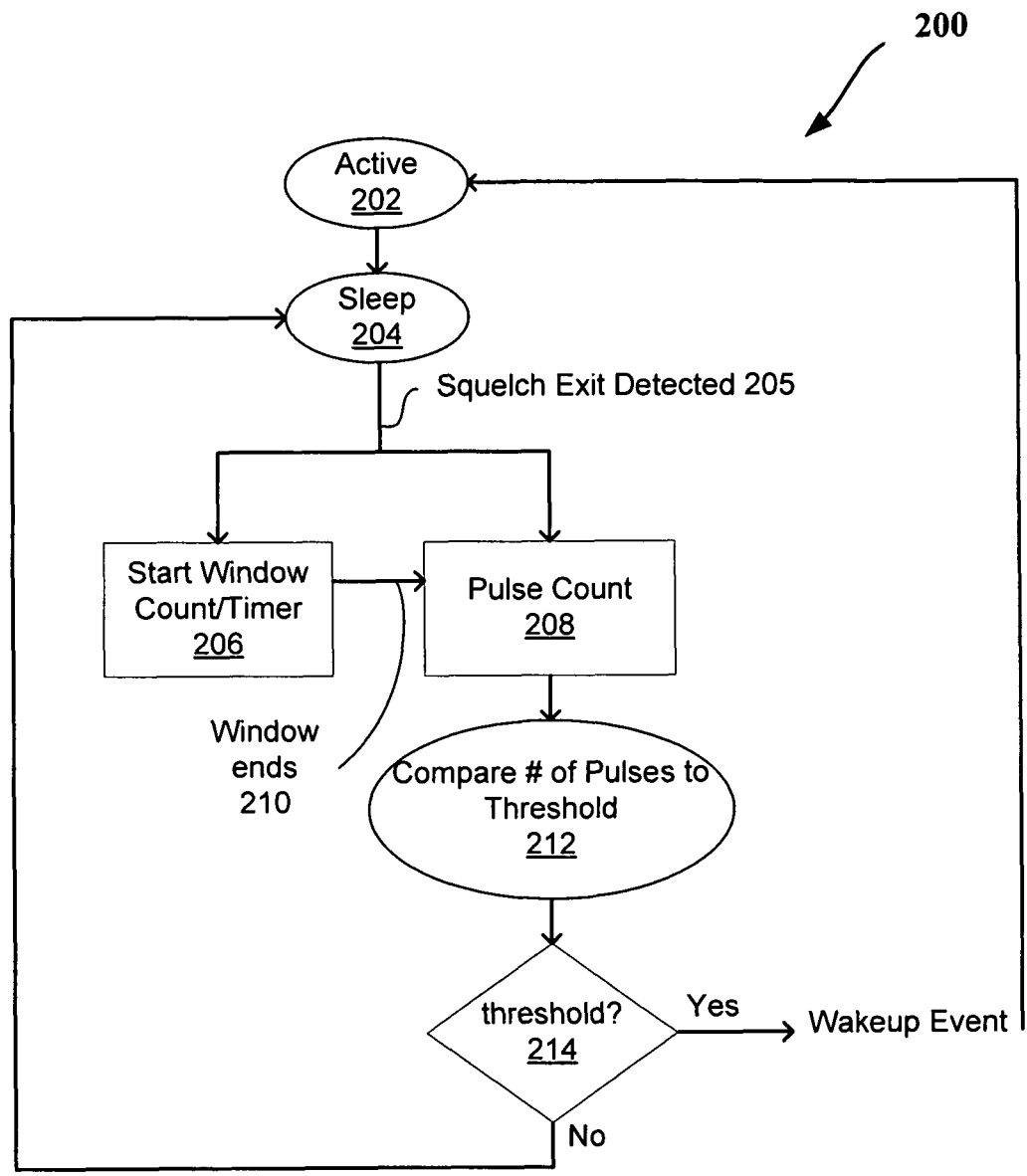
FIG. 2 illustrates a flow diagram according to an embodiment.
Figure 3:
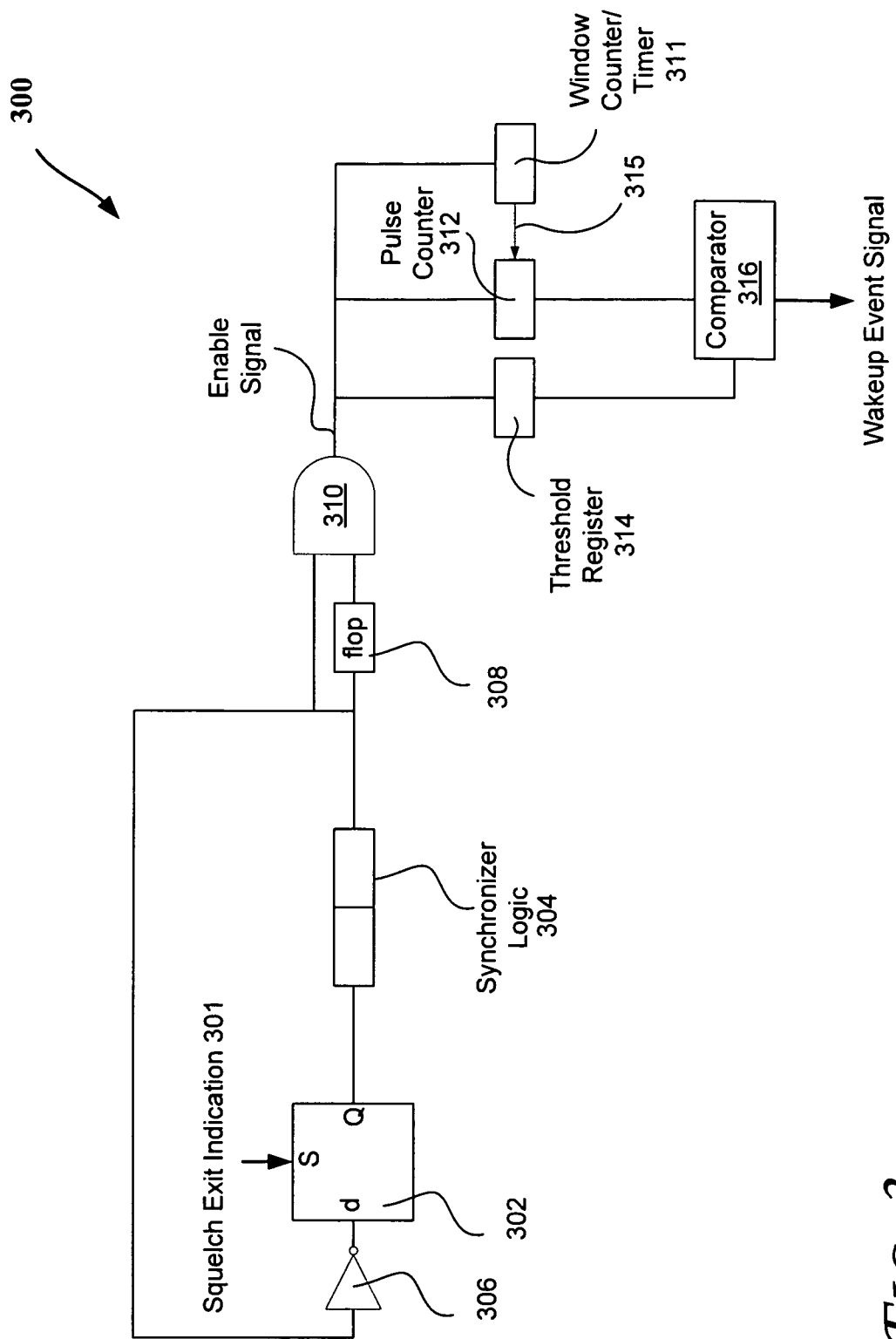
FIG. 3 illustrates a sample squelch filtration circuit according to an embodiment.

Also, as shown in FIG. 1, agent 102-1 may include a squelch detection logic 112-1 to determine when agent 102-1 is to exit a low power consumption state (e.g., L1), as discussed further herein, e.g., with reference to FIGS. 2 and 3.

Moreover, all or some of the other agents of system 100 may include their own squelch logic (not shown).

FIG. 2 illustrates a flow diagram of a method 200 to generate a wakeup event based on a plurality of pulses occurring during a select time period, according to an embodiment. In an embodiment, logic 112-1 of FIG. 1 may perform operations 205-214 of method 200. Also, circuit 300 of FIG. 3 may be used to perform operations 205-214 in some embodiments.

Referring to FIGS. 1-2, at an operation 202, an agent (such as agents 102) may be in an active state (such as L0). At an operation 204, the agent may enter a lower power consumption state (such as sleep or L1), for example, due to inactivity on a link to which the agent is attached (such as link 110 for agent 102-1 of FIG. 1). In some embodiments, at operation 204, only a portion of the agent may enter the lower power consumption state (e.g., portion(s) or a processor may be put into L1 and other portions may be left in L0). Once a squelch exit pulse is detected 205 (which may originate from another agent coupled to the agent of operation 202/204 via a serial link such as discussed with reference to FIG. 1), a window counter (e.g., counting clock cycles) or timer (counting time) may be started 206 and a pulse counter may also be started 208. The pulse count 208 will increment for each detected pulse until the window count/timer (e.g., after 50 ns or some other programmable number which may be stored in a register or a location within a memory) ends 210. Once the window count ends 210, the number of pulses from pulse count 208 are compared to a threshold value (e.g., 4 or some other programmable number which may be stored in a register or a location within a memory) at an operation 212. At an operation 214, if the threshold is reached (e.g., the number of pulses are equal to or alternatively exceed the threshold depending on the implementation), a wakeup event may occur (e.g., via a signal that causes the agent to enter active (e.g., L0) state) and method 200 may resume at operation 202. Otherwise, method 200 may resume with operation 204 (e.g., resetting pulse count and restarting window timer in response to squelch exit detected 205, etc.).

In an embodiment, a signal is considered a pulse (e.g., for the purpose of pulse count 208), only if it stays high for a certain amount of time (i.e., not edge detected, but (e.g., voltage) level detect). Alternatively, signals may be considered pulses if a correct number of rising edges (or falling edges depending on the implementation) are detected within a specified time period. Accordingly, in an embodiment, logic 112-1 counts the number of pulses received within a certain amount of time. If the logic sees the correct number of pulses within the specified time, then it treats the situation as a squelch exit indication; otherwise, it resets the pulse count and the pulse count timer and starts looking for a new sequence of pulses.

FIG. 3 illustrates a block diagram of a circuit 300 to generate a wakeup event based on a plurality of pulses occurring during a select time period, according to an embodiment. In one embodiment, logic 112-1 of FIG. 1 may include circuit 300. Also, at least some of the operations of method 200 of FIG. 2 may be performed by circuit 300 as discussed above.

As shown in FIG. 3, a squelch exit indication signal 301 (which may be the same or similar to signal 205 of FIG. 2) may be received on S input of a latch 302 (which may be edge or level triggered as discussed above with reference to FIG. 2). For example, the squelch exit indication signal 301 may be received from a link to which an agent is coupled. The latch 302 is coupled to a synchronizer logic 304. Logic 304 may provide clock crossing. More specifically the signal 301 may not be associated with any clock (e.g., it may be analog). Accordingly, synchronizer logic 304 adapts signal 301 to the clock domain of the recipient agent and may not be necessary in some embodiments, e.g., where signal 301 is already synchronized to the clock domain of the recipient agent.

The output of the logic 304 is provided to an inventor 306 (which is coupled to the "d" input of the latch 302), a flop 308 and an AND gate 310. The flop 308 may act as a delay element such that AND gate 310 will output a logic high signal for second and subsequent pulses 301. The output of AND gate 310 enables starting of a window counter/timer 311 (e.g., performing operation 206 of FIG. 2), a pulse counter 312 (which counts the pulses, such as defined with reference to FIG. 2 and operation 208), and cause a threshold register 314 to output its stored value.

Once the window counter/timer 311 the window has ended (see, e.g., window ending 210 of FIG. 2), it generates a signal 315 to the pulse counter 312 to output its pulse count (and reset the pulse count). The comparator 316 compares the value of the threshold register with the pulse count from 312 and generates a wakeup event signal to the agent that includes the circuit 300.

Figure 4:
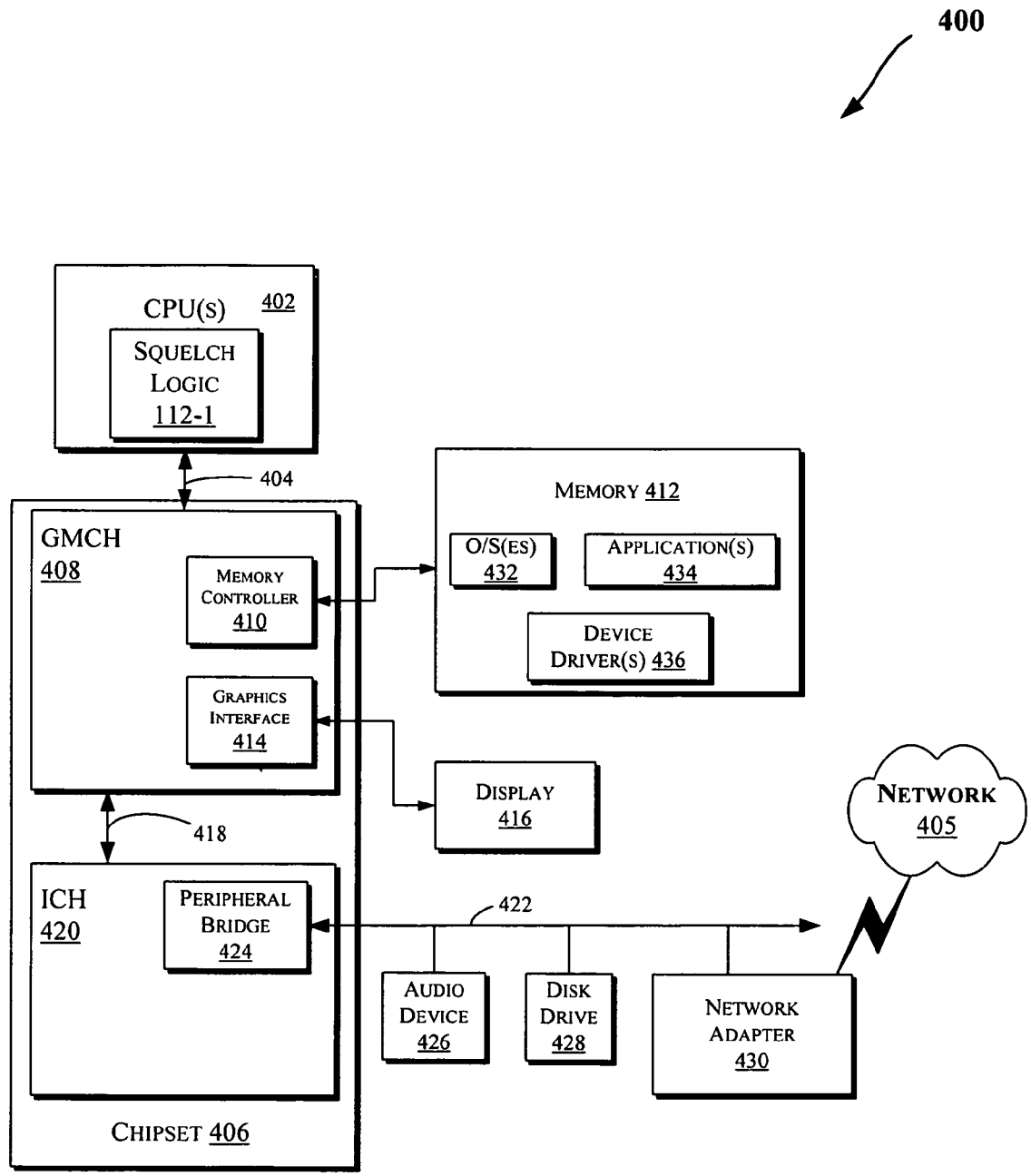

FIG. 4 illustrates a block diagram of an embodiment of a computing system 400. The computing system 400 may include one or more central processing unit(s) (CPUs) 402 (which may be collectively referred to herein as "processors 402" or more generically "processor 402") coupled to an interconnection network (or bus) 404. One or more of the agents 102 of FIG. 1 may comprise one or more components of the computing system 400. Also, one or more components of system 400 may include logic 112-1, including for example one or more of the processors 402. The processors 402 may be any type of processor such as a general purpose processor, a network processor (which may process data communicated over a computer network 405), etc. (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

The processor 402 may include one or more caches, which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 400. Additionally, such cache(s) may be located in various locations (e.g., inside other components to the computing systems discussed herein, including systems of FIG. 1 or 5).

A chipset 406 may additionally be coupled to the interconnection network 404. Further, the chipset 406 may include a graphics memory control hub (GMCH) 408. The GMCH 408 may include a memory controller 410 that is coupled to a memory 412. The memory 412 may store data, e.g., including sequences of instructions that are executed by the processor 402, or any other device in communication with components of the computing system 400. Also, in one embodiment of the invention, the memory 412 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 404, such as multiple processors and/or multiple system memories.

The GMCH 408 may further include a graphics interface 414 coupled to a display device 416 (e.g., via a graphics accelerator in an embodiment). In one embodiment, the graphics interface 414 may be coupled to the display device 416 via an accelerated graphics port (AGP). In an embodiment of the invention, the display device 416 (such as a flat panel display) may be coupled to the graphics interface 414 through, for example, a signal converter that translates a digital representation of an image stored in a storage device such as video memory or system memory (e.g., memory 412) into display signals that are interpreted and displayed by the display 416.

As shown in FIG. 4, a hub interface 418 may couple the GMCH 408 to an input/output control hub (ICH) 420. The ICH 420 may provide an interface to input/output (I/O) devices coupled to the computing system 400. The ICH 420 may be coupled to a bus 422 through a peripheral bridge (or controller) 424, such as a peripheral component interconnect (PCI) bridge that may be compliant with the PCIe specification, a universal serial bus (USB) controller, etc. The bridge 424 may provide a data path between the processor 402 and peripheral devices. Other types of topologies may be utilized. Also, multiple buses may be coupled to the ICH 420, e.g., through multiple bridges or controllers. Further, the bus 422 may comprise other types and configurations of bus systems. Moreover, other peripherals coupled to the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 422 may be coupled to an audio device 426, one or more disk drive(s) 428, and a network adapter 430 (which may be a NIC in an embodiment). In one embodiment, the network adapter 430 or other devices coupled to the bus 422 may communicate with the chipset 406. Other devices may be coupled to the bus 422. Also, various components (such as the network adapter 430) may be coupled to the GMCH 408 in some embodiments of the invention. In addition, the processor 402 and the GMCH 408 may be combined to form a single chip. In an embodiment, the memory controller 410 may be provided in one or more of the CPUs 402. Further, in an embodiment, GMCH 408 and ICH 420 may be combined into a Peripheral Control Hub (PCH).

Additionally, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 412 may include one or more of the following in an embodiment: an operating system (O/S) 432, application 434, and/or device driver 436. The memory 412 may also include regions dedicated to Memory Mapped I/O (MMIO) operations. Programs and/or data stored in the memory 412 may be swapped into the disk drive 428 as part of memory management operations. The application(s) 434 may execute (e.g., on the processor(s) 402) to communicate one or more packets with one or more computing devices coupled to the network 405. In an embodiment, a packet may be a sequence of one or more symbols and/or values that may be encoded by one or more electrical signals transmitted from at least one sender to at least on receiver (e.g., over a network such as the network 405). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 405).

In an embodiment, the application 434 may utilize the O/S 432 to communicate with various components of the system 400, e.g., through the device driver 436. Hence, the device driver 436 may include network adapter 430 specific commands to provide a communication interface between the O/S 432 and the network adapter 430, or other I/O devices coupled to the system 400, e.g., via the chipset 406.

In an embodiment, the O/S 432 may include a network protocol stack. A protocol stack generally refers to a set of procedures or programs that may be executed to process packets sent over a network 405, where the packets may conform to a specified protocol. For example, TCP/IP (Transport Control Protocol/Internet Protocol) packets may be processed using a TCP/IP stack. The device driver 436 may indicate the buffers in the memory 412 that are to be processed, e.g., via the protocol stack.

The network 405 may include any type of computer network. The network adapter 430 may further include a direct memory access (DMA) engine, which writes packets to buffers (e.g., stored in the memory 412) assigned to available descriptors (e.g., stored in the memory 412) to transmit and/or receive data over the network 405. Additionally, the network adapter 430 may include a network adapter controller, which may include logic (such as one or more programmable processors) to perform adapter related operations. In an embodiment, the adapter controller may be a MAC (media access control) component. The network adapter 430 may further include a memory, such as any type of volatile/nonvolatile memory (e.g., including one or more cache(s) and/or other memory types discussed with reference to memory 412).

Figure 5:
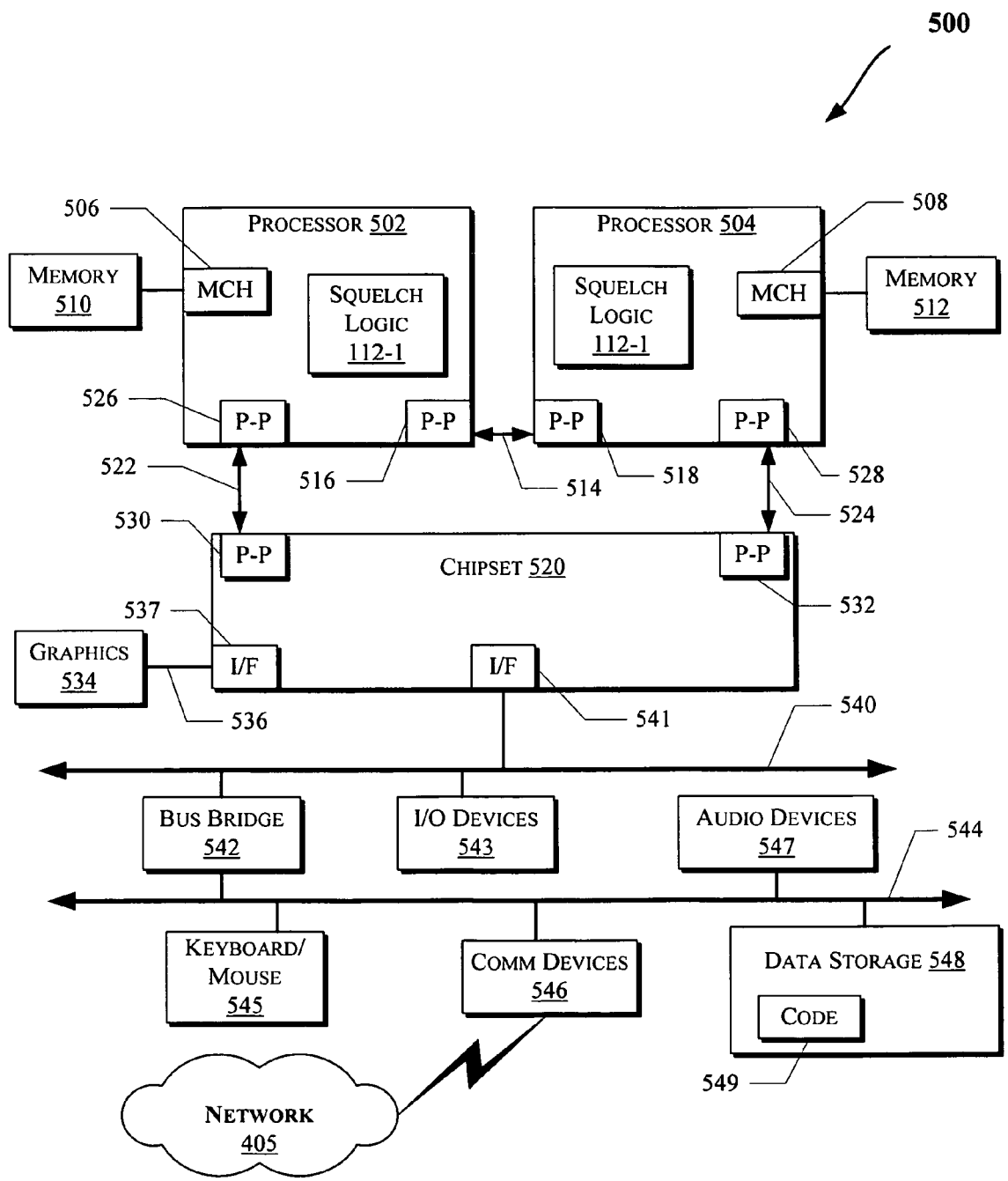

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (GMCH) 506 and 508 to enable communication with memories 510 and 512. The memories 510 and/or 512 may store various data such as those discussed with reference to the memory 412 of FIG. 4. As shown in FIG. 5, the processors 502 and 504 (or other components of system 500 such as chipset 520, I/O devices 543, etc.) may also include one or more cache(s) such as those discussed with reference to FIGS. 1-4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, the processors 502, 504 may include logic 112-1. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 405), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first agent, coupled to a second agent, the first agent to comprise a logic to determine whether the first agent is to exit a lower power consumption state, the logic comprising:
a pulse counter to count a number of pulses received by the logic during a time period, wherein the pulse counter is to start to count the number of pulses in response to detection of a squelch exit pulse from the second agent; and
a comparator to generate a wakeup event signal to cause the first agent to exit the lower power consumption state based on a comparison of an output of the pulse counter with a threshold value, wherein the second agent is to generate the pulses that are to be counted by the pulse counter during the time period.

2. The apparatus of claim 1, further comprising a window timer to indicate an end of the time period to the pulse counter.

3. The apparatus of claim 1, further comprising an AND gate to receive a signal corresponding to the pulse and a delayed version of the signal corresponding to the pulse.

4. The apparatus of claim 1, further comprising a register, coupled to the comparator, to store the threshold value.

5. The apparatus of claim 1, wherein the pulse counter is to count pulses based on edges of the pulses.

6. The apparatus of claim 1, wherein the pulse counter is to count pulses based on levels of the pulses.

7. The apparatus of claim 1, wherein the first agent and the logic are on a same integrated circuit die.

8. The apparatus of claim 1, further comprising a processor that comprises the first agent.

9. The apparatus of claim 1, wherein the processor comprises a plurality of processor cores.

10. The apparatus of claim 1, wherein the comparison of the output of the pulse counter with the threshold value is to only be performed after expiration of a window timer and wherein the pulse counter is to count each detected pulse received from the second agent until the window timer expires.

11. A method comprising:
counting a number of pulses received by a first agent from a second agent during a time period, wherein a pulse counter is to start to count the number of pulses in response to detection of a squelch exit pulse from the second agent; and
generate a wakeup event signal to cause the first agent is to exit a lower power consumption state based on a comparison of the number of pulses and a threshold value.

12. The method of claim 11, further comprising coupling the first agent and the second agent via a serial link.

13. The method of claim 11, further comprising terminating the counting in response to an indication of an end of the time period.

14. The method of claim 11, wherein counting the number of pulses is performed based on edges of the pulses.

15. The method of claim 11, wherein counting the number of pulses is performed based on levels of the pulses.

16. The method of claim 11, wherein the comparison of the number of pulses with the threshold value is to only be performed after expiration of a window timer and wherein the counting of the number of pulses is to be performed for each detected pulse received from the second agent until the window timer expires.

17. A system comprising:
a serial link to couple a first agent and a second agent;
the first agent to comprise a squelch logic to determine whether the first agent is to exit a lower power consumption state, the squelch logic comprising:
a pulse counter to count a number of pulses received by the logic during a time period, wherein the pulse counter is to start to count the number of pulses in response to detection of a squelch exit pulse from the second agent;

a comparator to generate a wakeup event signal to cause the first agent is to exit the lower power consumption state based on a comparison of an output of the pulse counter with a threshold value; and a window timer to indicate an end of the time period to the pulse counter, wherein the second agent is to generate the pulses that are to be counted by the pulse counter during the time period.

18. The system of claim 17, further comprising an AND gate to receive a signal corresponding to the pulse and a delayed version of the signal corresponding to the pulse.

19. The system of claim 18, further comprising an audio device coupled to at least one of the first or second processors.

20. The system of claim 17, wherein the pulse counter is to count pulses based on edges or levels of the pulses.

* * * * *